(12) United States Patent
Dögel et al.

(10) Patent No.: US 9,086,136 B2
(45) Date of Patent: Jul. 21, 2015

(54) GEARWHEEL, IN PARTICULAR PLANET GEAR FOR A PLANETARY GEAR SET, AND ROTARY VIBRATION DAMPING ARRANGEMENT HAVING A GEARWHEEL OF SAID TYPE

(75) Inventors: Thomas Dögel, Nuedlingen (DE);
Daniel Lorenz, Bad Kissingen (DE);
Thomas Weigand, Schweinfurt (DE);
Cora Carlson, Dittelbrunn (DE)

(73) Assignee: ZF Friedrichshafen AG, Friedrichschafen (DE)

( * ) Notice: Subject to any disclaimer, the term of this patent is extended or adjusted under 35 U.S.C. 154(b) by 0 days.

(21) Appl. No.: 14/234,926

(22) PCT Filed: Jun. 27, 2012

(86) PCT No.: PCT/EP2012/062396
§ 371 (c)(1),
(2), (4) Date: Jan. 24, 2014

(87) PCT Pub. No.: WO2013/013919
PCT Pub. Date: Jan. 31, 2013

(65) Prior Publication Data
US 2014/0162834 A1   Jun. 12, 2014

(30) Foreign Application Priority Data
Jul. 25, 2011   (DE) .................. 10 2011 079 695

(51) Int. Cl.
*F16H 57/08* (2006.01)
*F16H 55/17* (2006.01)
*F16H 57/00* (2012.01)

(52) U.S. Cl.
CPC ............ *F16H 55/17* (2013.01); *F16H 57/0025* (2013.01)

(58) Field of Classification Search
None
See application file for complete search history.

(56) References Cited

U.S. PATENT DOCUMENTS

| 1,418,447 | A | * | 6/1922 | Leipert ........................... 74/432 |
| 1,520,625 | A | * | 12/1924 | Wigley .......................... 408/186 |
| 1,968,604 | A | * | 7/1934 | Stanislas et al. .............. 475/339 |
| 2,247,839 | A | * | 7/1941 | Halford et al. ................ 475/347 |
| 2,748,618 | A | * | 6/1956 | Lee ................................. 74/439 |
| 2,759,376 | A | * | 8/1956 | Chamberlin et al. ......... 475/338 |
| 2,804,785 | A | * | 9/1957 | Mendez ........................ 475/338 |
| 2,868,040 | A | * | 1/1959 | Chamberlin ................... 475/92 |
| 2,976,741 | A | * | 3/1961 | Martin ............................. 74/432 |
| 3,381,548 | A | * | 5/1968 | Wolkenstein ................. 475/338 |
| 3,831,459 | A | * | 8/1974 | Satzler et al. ................... 74/439 |

(Continued)

FOREIGN PATENT DOCUMENTS

| DE | 26 28 826 A1 | 2/1978 |
| DE | 31 39 658 A1 | 4/1983 |

(Continued)

*Primary Examiner* — Dirk Wright
(74) *Attorney, Agent, or Firm* — Cozen O'Connor

(57) ABSTRACT

A gearwheel for a planetary gear train includes two working toothing regions arranged successively in direction of a gearwheel rotational axis (Z). A first working toothing region is arranged at a first gearwheel part, and a second working toothing region is arranged at a second gearwheel part. The two gearwheel parts are connected to one another by positive engagement and/or bonding engagement and/or frictional engagement so as to rotate together around the gearwheel rotational axis (Z) and/or against relative movement with respect to one another in direction of the gearwheel rotational axis (Z).

20 Claims, 8 Drawing Sheets

(56) References Cited

U.S. PATENT DOCUMENTS

| | | | |
|---|---|---|---|
| 4,042,434 A * | 8/1977 | Ivanko | 156/91 |
| 5,634,866 A * | 6/1997 | Sudau | 475/347 |
| 5,863,274 A * | 1/1999 | Jackel | 475/347 |
| 6,553,868 B2 * | 4/2003 | Takenaka et al. | 74/665 B |
| 6,877,928 B2 * | 4/2005 | Yumoto | 403/359.1 |
| 8,523,732 B2 * | 9/2013 | Le Moal | 475/347 |
| 2002/0029646 A1 | 3/2002 | Takenaka et al. | |
| 2006/0251472 A1 * | 11/2006 | Stauber | 403/345 |
| 2011/0030489 A1 | 2/2011 | Chen et al. | |
| 2013/0091863 A1 * | 4/2013 | Makulec et al. | 60/788 |
| 2014/0298941 A1 * | 10/2014 | Berhan | 74/445 |

FOREIGN PATENT DOCUMENTS

| | | |
|---|---|---|
| DE | 195 17 605 A1 | 11/1995 |
| DE | 100 58 482 A1 | 6/2002 |
| EP | 0 627 575 A1 | 12/1994 |
| EP | 1 429 048 A1 | 6/2004 |
| GB | 1 458 171 A | 12/1976 |
| JP | 5 071593 A | 3/1993 |
| JP | 8 303558 A | 11/1996 |
| RO | 106 157 B1 | 2/1993 |
| WO | WO 93/16302 A1 | 8/1993 |
| WO | WO 2010 069645 A1 | 6/2010 |
| WO | WO 2011/023815 A2 | 3/2011 |

\* cited by examiner

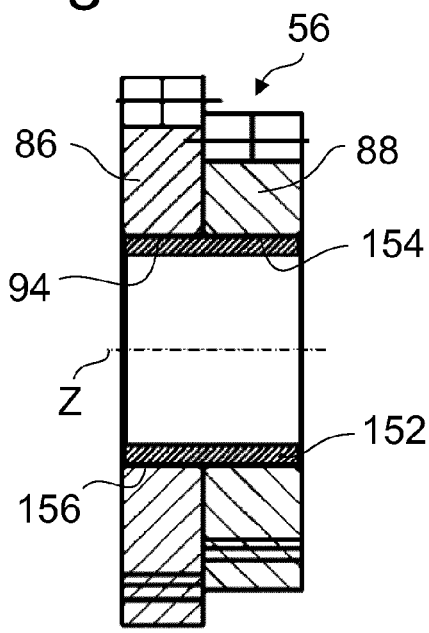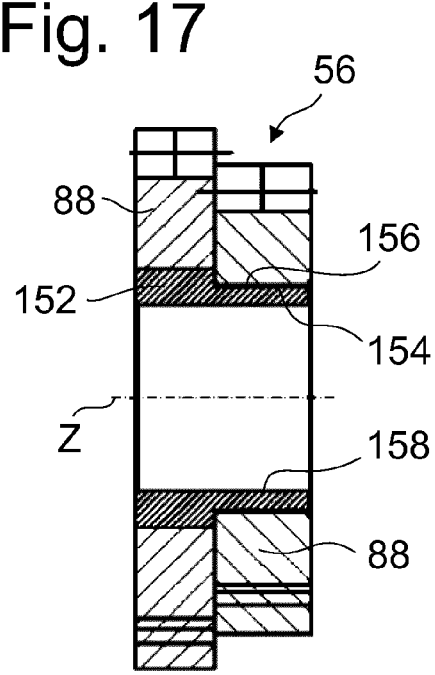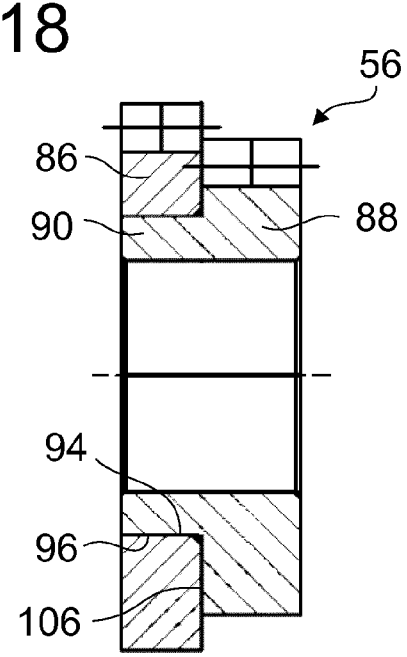

GEARWHEEL, IN PARTICULAR PLANET GEAR FOR A PLANETARY GEAR SET, AND ROTARY VIBRATION DAMPING ARRANGEMENT HAVING A GEARWHEEL OF SAID TYPE

CROSS-REFERENCE TO RELATED APPLICATIONS

This is a U.S. national stage of application No. PCT/EP2012/062396, filed on 27 Jun. 2012, which claims priority to the German Application No. 10 2011 079 695.9, filed 25 Jul. 2011, the content of both incorporated herein by reference.

BACKGROUND OF THE INVENTION

1. Field of the Invention

The present invention is directed to a gearwheel which can be used, for example, as a planet wheel in a planetary gear train in a torsional vibration damping arrangement for the drivetrain of a vehicle.

2. Related Art

FIG. 1 shows in a fragmentary longitudinal section a torsional vibration damping arrangement 10 which is configured to be positioned in the drivetrain of a vehicle. The torsional vibration damping arrangement 10 comprises an input region 12, which is to be connected by screws, for example, to the crankshaft of an internal combustion engine, i.e., generally a drive unit, and which is therefore to be driven in rotation around an axis of rotation A. An output region 14 of the torsional vibration damping arrangement 10 is formed with a flywheel 16 to which is connected, for example, a pressure plate assembly of a friction clutch and which can provide a friction surface 18 for a friction clutch of this kind. Two torque transmission paths 20, 22 arranged between the input region 12 and the output region 14 branch out in the input region 12 and converge in the region of a coupling arrangement which is designated generally by 24.

A phase shifter arrangement, designated generally by 26, is provided in the first torque transmission path 20. Torsional vibrations or generally rotational irregularities which are introduced into the torsional vibration damping arrangement 10 in the input region 12 and which are also partially transmitted via the first torque transmission path 20 can be shifted in phase by the phase shifter arrangement 26 with respect to the corresponding torsional vibrations or rotational irregularities, which are also contained in the torque component transmitted via the second torque transmission path 22. These two torque components with torsional vibration components, which are out of phase relative to one another, are brought together in the region of the coupling arrangement 24 so that the vibration components, which are out of phase relative to one another, ideally cancel each other so that a total torque that is substantially free from rotational irregularities and torsional vibrations is introduced into the output region 14.

The phase shifter arrangement 26 comprises a vibration system 28 with a first primary side 30 that is formed generally by two cover disk elements 32, 34. The torsional vibration damping arrangement 10 is fixedly connected to a driveshaft or the like in the region of cover disk element 32. The vibration system 28 further comprises a first secondary side 36, which is substantially provided in this case by a central disk element 38 positioned between the two cover disk elements 30, 34. A first damper element arrangement 40, which is formed by a plurality of springs, preferably helical compression springs, acts between the first primary side 30 and the first secondary side 36 and allows the latter to rotate relative to one another around the axis of rotation A while generating a restoring action.

In the radially inner region, the central disk element 38 provides a second primary side 42. A second secondary side 44, which again comprises two cover disk elements 46, 48, is associated with this second primary side 42. A second damper element arrangement 50 which, for example, again comprises a plurality of springs, e.g., helical compression springs, which are distributed in circumferential direction acts between the second primary side 42 and the second secondary side 44 so that the second primary side 42 and the second secondary side 44, are rotatable relative to one another around the axis of rotation A accompanied by the restoring action of the second damper element arrangement 50.

It will be seen that the vibration system 28 is formed with two stages with two vibration dampers acting in series and comprising the two damper element arrangements 40, 50. In so doing, the first primary side 30 substantially forms the primary side of the entire vibration system 28, i.e., that side on which the torque is introduced in the tension state, while the second secondary side 44 provides the secondary side of the entire vibration system 28, i.e., that side via which the torque is transmitted.

An essential characteristic of vibration systems of this kind is that they operate subcritically in an excitation frequency range below their natural or resonant frequency, i.e., excitation and reaction of the system at the primary side 30 on the one hand and at the secondary side 44 on the other hand take place substantially simultaneously, i.e., in the same phase without a mutual phase shift. When the resonant frequency is exceeded, the vibration system 28 passes into a supercritical state in which excitation and reaction are shifted in phase with respect to one another. Accordingly, a maximum phase shift of 180° can occur. As a result, when there are exciting frequencies in the torque received at the input region 12 which are above the resonant frequency and therefore, depending on the quality of vibration decoupling, undergo a maximum phase shift of 180° in the first torque transmission path 20 with respect to the vibration excitation components contained in the torque component of the second torque transmission path 22, there is, ideally, a complete destructive superposition of these vibration components with the in-phase vibration components in the coupling arrangement 24.

The coupling arrangement 24 comprises a planetary gear arrangement 52 with a planet wheel carrier 54. This planet wheel carrier 54 together with the primary side 30 of the vibration system 28 is connected to the driveshaft and is associated with the second torque transmission path 22. A plurality of planet wheels, designated generally by 56, are rotatably supported at the planet wheel carrier 54 so as to be distributed in a circumferential direction. For this purpose, a plurality of planet wheel carrying bolts 58 are provided at the planet wheel carrier 54, as is clearly shown in FIG. 2. The planet wheels 56 are rotatable around the rotational axes thereof, which are oriented substantially parallel to the axis of rotation A of the planet wheel carrier 54, via a bearing 60, which is formed, for example, as a needle bearing or other type of rolling element bearing. The planet wheels 56 are held so as to be axially centered between two supporting elements 62, 64 formed, e.g., as annular disks or the supporting element 64 and planet wheel carrier 54. Respective stop disks 66, 68, 70, 72, which can annularly surround the planet wheel rotational axes Z, provide for a low-friction axial support of the planet wheels 56.

The planet wheels 56 have two working toothing regions 74, 76 arranged successively in direction of the rotational axes Z of the planet wheels. Working toothing region 74, which is formed in the depicted example with greater radial dimensioning with respect to the rotational axis Z of the planet wheels, meshingly engages with a ring gear 78, which is fixed to a ring gear carrier 82 and which, for example, can have an annular or ring segment shape. The ring gear carrier 82 is in turn fixedly connected, for example, by screws, to the second secondary side 44, i.e., generally the secondary side of the vibration system 28, and is accordingly associated with the first torque transmission path 20. The torque, which is transmitted via the first torque transmission path 20 and conveyed by the vibration system 28, is introduced into the coupling arrangement 24, namely, the working toothing region 74 of the planet wheels 56, via the ring gear carrier 82 and ring gear 78. The torque transmitted via the second torque transmission path 22 is introduced into the coupling arrangement 24 via the planet wheel carrier 54 and the planet wheel carrying bolts 58. The torque components brought together in this way are conveyed as a total torque via working toothing region 76 into a ring gear 84 which has an annular or ring segment shape, for example. The ring gear 84 is connected to the flywheel 16 by screws and is accordingly associated with the output region 14.

By bringing together the two torque components of the two torque transmission paths 20, 22 in the coupling arrangement 24 formed with the planetary gear train 52, a superposition takes place when the vibration system 28 passes into the supercritical state as a result of the vibration excitation such that the vibration components are at least partially canceled and the flywheel 16 receives a substantially smoothed torque. In this respect, the magnitude of the torque components transmitted via the two torque transmission paths 20, 22 can be influenced through the choice of the diameter ratio of the two working toothing regions 74, 76 or also by means of the design of the tooth geometry of these two working toothing regions 74, 76. In the depicted example, in which the working toothing region 74 cooperating with the ring gear 78 of the first torque transmission path 20 has a greater radial dimensioning than the working toothing region cooperating with the ring gear 84 of the output region 14, a transmission ratio of i>1 is achieved, which means that a torque component is transmitted in direction of the planetary gear train 52 via each of the two torque transmission paths, and the ratio of components can be adjusted through the relative proportions or diameter ratio of the two working toothing regions 74, 76. If working toothing region 76 has a greater diameter than working toothing region 74, a torque reversal takes place in the second torque transmission path 22, whereas torque is increased in the first torque transmission path 20, so that when the torque components are brought together in the coupling arrangement 24 a total torque that corresponds to the introduced torque is achieved again, but wherein the vibration components are at least partially eliminated.

To provide this possibility of influencing the torque components transmitted via the two torque transmission paths 20, 22 through the configuration of the planet wheels 56, it is necessary to be able to configure the two working toothing regions 74, 76 independently from one another, that is, with a different diameter with respect to the planet wheel rotational axis Z and/or different toothing geometry. To this end, as is clearly shown in FIGS. 1 and 2, the planet wheels 56 can be constructed with two gearwheel parts 86, 88, wherein the first working toothing region 74, i.e., the working toothing region cooperating with the ring gear 78 of the first torque transmission path 20, is formed at the first gearwheel part 86, while the second working toothing region 76 cooperating with the output-side ring gear 84 is formed at the second gearwheel part 86. In order to achieve the combination of the two torque components described above, it is necessary that the two gearwheel parts 86, 88 are fixedly connected to one another, in particular so as to be fixed with respect to relative rotation.

SUMMARY OF THE INVENTION

It is an object of the present invention to provide a gearwheel, particularly a planet wheel for a planetary gear train, which comprises at least two working toothing regions respectively at gearwheel parts which are formed separately from one another.

According to one aspect of the invention, a gearwheel, particularly a planet wheel for a planetary gear train, comprises two working toothing regions successively in direction of a gearwheel rotational axis, wherein a first working toothing region is provided at a first gearwheel part and a second working toothing region is provided at a second gearwheel part, wherein the two gearwheel parts are connected to one another by positive engagement and/or bonding engagement and/or frictional engagement so as to rotate together around the gearwheel rotational axis and/or against relative movement with respect to one another in direction of the gearwheel rotational axis.

With the gearwheel so constructed, it is possible to provide working toothing regions that are configured differently with respect to one another, so that it is possible to bring together torques through the different options for fixedly connecting the two gearwheel parts without noticeably affecting finishing steps that have been performed on the individual gearwheel parts beforehand. Of course, the various joining arrangements or processes can be realized in combination or also individually.

For example, the positive engagement can be produced by:
at least one connection element in positive engagement with the first gearwheel part and/or the second gearwheel part and/or
connection toothings provided at the first gearwheel part and at the second gearwheel part.

According to one aspect of the invention, a positive engagement interaction that can be realized easily through the use of a connection element can be obtained in that the at least one connection element is formed in a pin-shaped manner and engages in a connection cutout of the first gearwheel part and a connection cutout of the second gearwheel part, wherein, further, the gearwheel parts can be held by the at least one connection element against relative movement in direction of the gearwheel rotational axis.

For example, in one aspect, the construction can be carried out such that the connection cutout at one of the gearwheel parts is formed radially outwardly at an inner circumferential surface as a bulge extending in direction of the gearwheel rotational axis and the connection cutout at the other gearwheel part is formed radially inwardly at an outer circumferential surface as a bulge extending in direction of the gearwheel rotational axis, and the at least one connection element is positioned radially between the inner circumferential surface and the outer circumferential surface. In so doing, the axial engagement of the two gearwheel parts can be realized in a simpler manner in that the at least one connection element is pressed into the connection cutouts associated with this connection element.

In another aspect, the connection cutouts can be formed at the gearwheel parts as through-openings, wherein the at least one connection element is positioned so as to engage in connection cutouts of the two gearwheel parts, which connection cutouts are positioned so as to be aligned with one another. In order to provide the axial engagement of the gearwheel parts in a simple manner, it is suggested that the at least one connection element engages behind at least one gearwheel part, preferably both gearwheel parts, at its side remote of the other gearwheel part.

In yet another aspect, the at least one connection element is formed in a sleeve-shaped manner with an outer circumferential connection toothing, wherein an inner circumferential connection toothing is provided at at least one gearwheel part, preferably at both gearwheel parts, for engaging with the outer circumferential connection toothing. By outer circumferential connection toothing and inner circumferential connection toothing is meant herein a toothing with teeth extending radially away from a core region, for example, in the manner of a spur toothing. In a further embodiment form making use of circumferential toothings of this kind, it is suggested that an outer circumferential connection toothing is provided at one of the gearwheel parts and an inner circumferential connection toothing engaging with the outer circumferential connection toothing is provided at the other gearwheel part. In so doing, the outer circumferential connection toothing can comprise the working toothing of the one gearwheel part, for example.

In another aspect, in which the coupling of the two gearwheel parts for joint rotation can be produced in a particularly simple manner by positive engagement, it is suggested that a first axial connection toothing is provided at one of the gearwheel parts and a second axial connection toothing engaging with the first axial connection toothing is provided at the other gearwheel part.

If the connection of the two gearwheel parts is to be produced by bonding engagement exclusively or in addition to the positive engagement and/or frictional engagement, this bonding engagement can be produced by welding and/or soldering and/or gluing. If a welding process is used, fusion welding, preferably laser welding, electron beam welding, induction welding, electric resistance welding or, alternatively, friction welding and, e.g., ultrasonic welding are possible in particular.

In order to produce the bonding engagement connection, the gearwheel parts are connected in the region of radially or axially opposed surfaces. In order to catch particulate contaminants while carrying out a welding process, a particle collection cutout can be provided in the region of the axially or radially opposed surfaces in at least one gearwheel part.

If the connection of the two gearwheel parts is to be carried out by frictional engagement as an alternative to or in addition to the above-described steps, i.e., positive engagement and bonding engagement, this frictional engagement can be carried out by an interference fit and/or shrink fit.

To this end, for example, a sleeve-shaped connection element having a circumferential surface, preferably an outer circumferential surface, in frictional engagement with at least one of the gearwheel parts can be used.

Alternatively, in a particularly advantageous variant with respect to minimizing the number of structural component parts to be used, one of the gearwheel parts can have a circumferential surface, preferably an outer circumferential surface, in frictional engagement with the other gearwheel part.

The present invention according to another aspect is further directed to a planetary gear train comprising a planet wheel carrier with a plurality of planet wheels according to the invention arranged successively in circumferential direction around a planet wheel carrier rotational axis.

The present invention according to yet another aspect is further directed to a torsional vibration damping arrangement, particularly for the drivetrain of a vehicle, comprising an input region to be driven in rotation around an axis of rotation and an output region, wherein a first torque transmission path and parallel thereto a second torque transmission path are provided between the input region and the output region, further comprising a coupling arrangement for superposing the torques transmitted via the torque transmission paths, wherein the coupling arrangement comprises a planetary gear arrangement with a planet wheel carrier coupled to one of the torque transmission paths and planet wheels according to the invention rotatably supported at the planet wheel carrier.

In accordance with an aspect of the present invention, in order to achieve a phase shift of the torque components transmitted via the two torque transmission paths and of vibrations contained therein in a simple and also defined manner in a torsional vibration damping arrangement of the aforementioned type, a phase shifter arrangement is provided at least in the other torque transmission path for generating a phase shift of rotational irregularities transmitted via the other torque transmission path relative to rotational irregularities transmitted via the one torque transmission path.

In this connection, the phase shifter arrangement can comprise a vibration system with a primary side and a secondary side which is rotatable with respect to the primary side around the axis of rotation against the action of a damper element arrangement. This means that the vibration system can be constructed in the manner of a torsional vibration damper arrangement, possibly a multi-stage torsional vibration damper arrangement with torsional vibration dampers acting in series.

BRIEF DESCRIPTION OF THE DRAWINGS

Exemplary embodiments of the present invention will be described in detail in the following with reference to the accompanying drawings. In the drawings:

FIG. 16 is a further axial sectional view of an alternative construction of the planet wheel;

FIG. 17 is a further axial sectional view of an alternative construction of the planet wheel; and FIG. 18 is a further axial sectional view of an alternative construction of the planet wheel.

DETAILED DESCRIPTION OF THE PRESENTLY PREFERRED EMBODIMENTS

Figure 1:
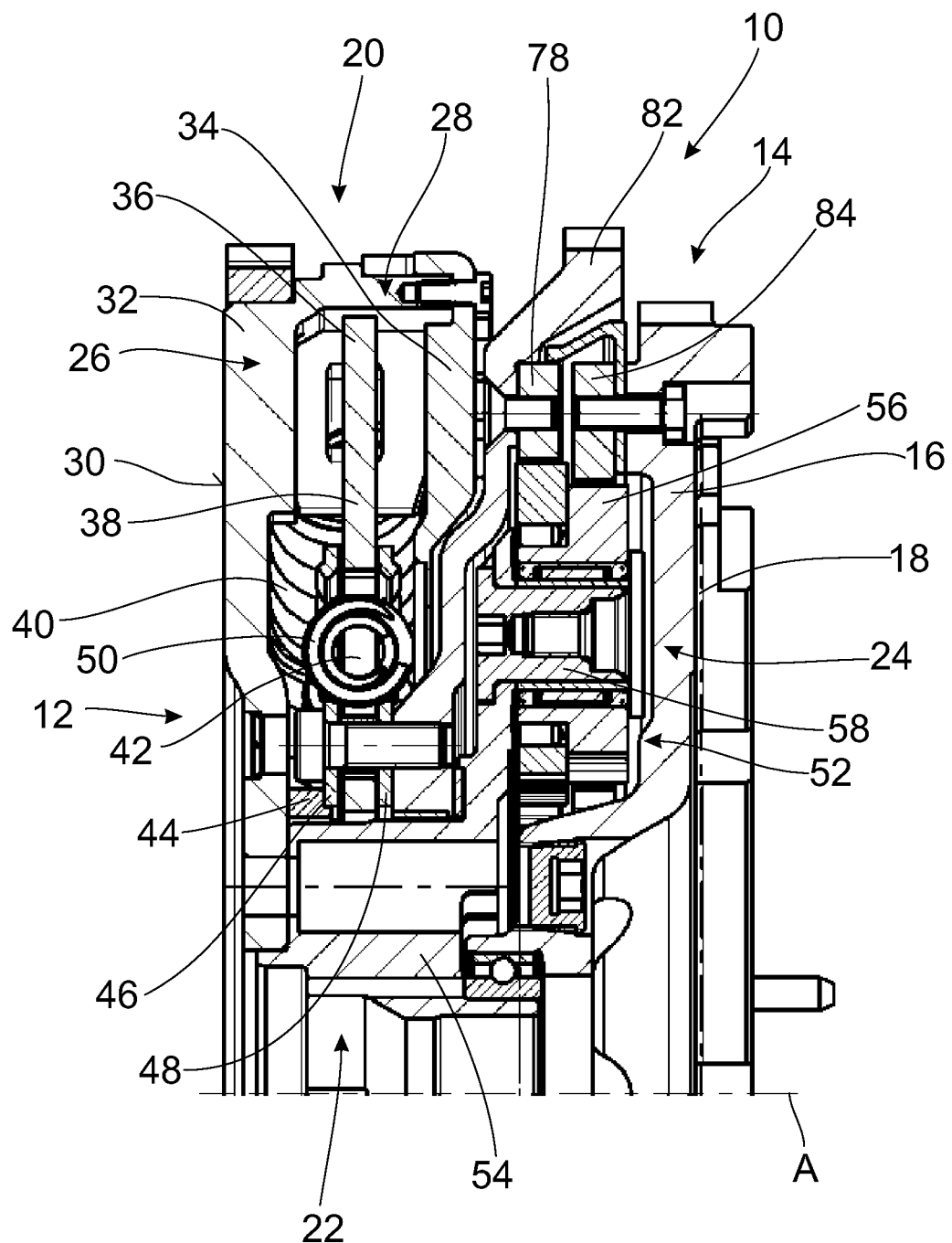
FIG. 1 is a fragmentary longitudinal sectional view of a torsional vibration damping arrangement.

In the following, various exemplary embodiments of planet wheels 56 are described such as can be used, for example, in the torsional vibration damping arrangement described above with reference to FIG. 1. It should be noted that the principles of the present invention are applied in a particularly advantageous manner in such planet wheels and in the torsional vibration damping arrangements having these planet wheels. In principle, however, the present invention can be used in any type of gearwheel in which two toothing regions that differ from one another are advantageously provided or required at one and the same gearwheel.

Figure 2:
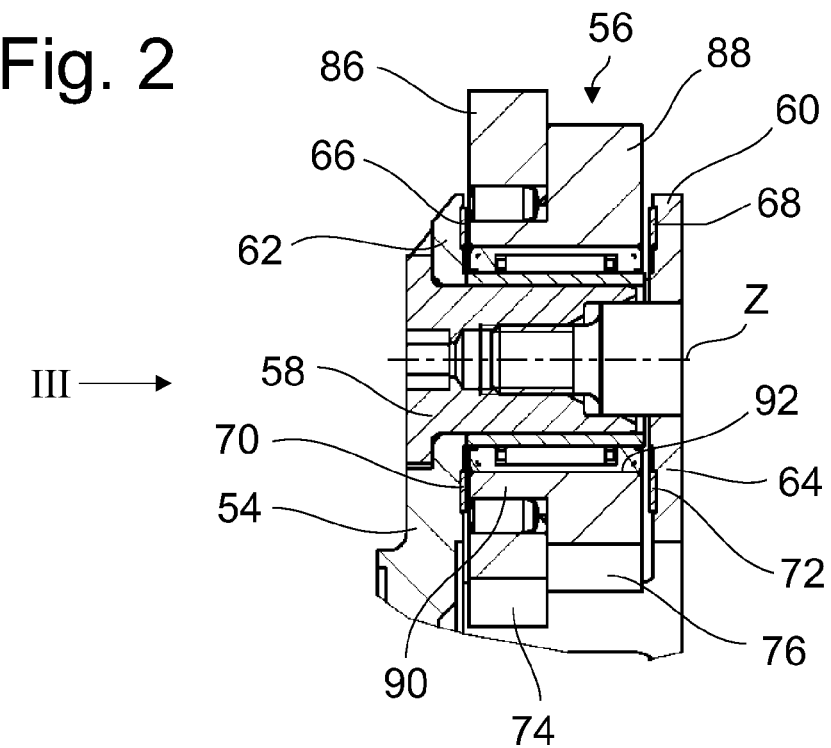
FIG. 2 is an enlarged detail of the torsional vibration damping arrangement of FIG. 1 with a planet wheel carrier and a planet wheel rotatably carried thereon.

It will be seen in FIG. 2 that the gearwheel part 88 has in its radially inner region an approximately cylindrical projection 90 extending axially beyond the working toothing region 76 of gearwheel part 88 and into an inner circumferential opening of gearwheel part 86. Accordingly, gearwheel part 88 extends substantially along the entire axial extension length of the planet wheel 56 and, at its inner circumferential surface 92, provides a bearing surface at which, for example, the rolling element bearing 60 or a differently shaped bearing formed, for example, as a plain bearing can engage.

Figure 3:
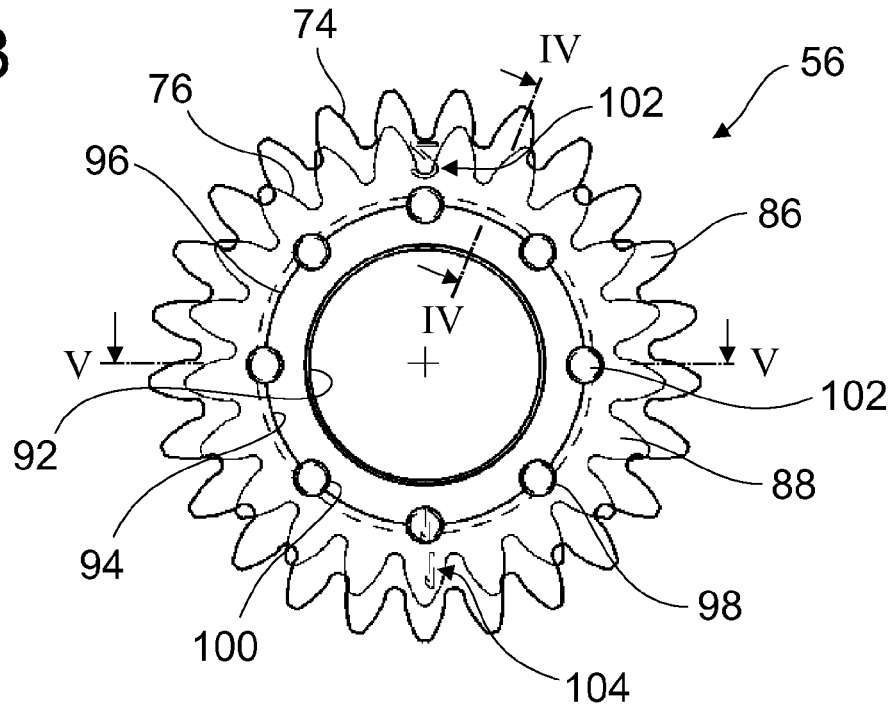
FIG. 3 is an axial view of a planet wheel.
Figure 4:
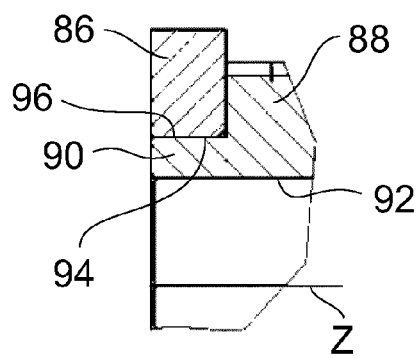
FIG. 4 is a fragmentary axial sectional view of the planet wheel of FIG. 3 in section along line IV-IV in FIG. 3.
Figure 5:
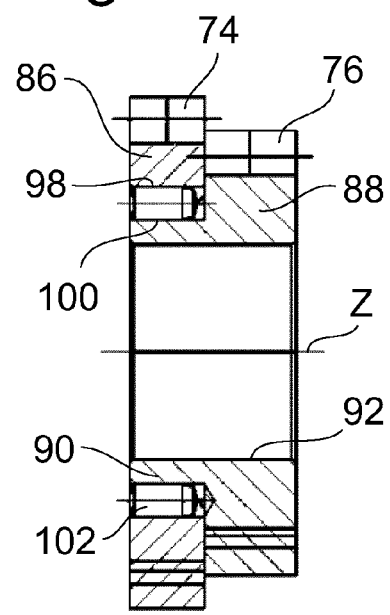
FIG. 5 is an axial sectional view of the planet wheel of FIG. 3 in section along line V-V in FIG. 3.

In the axial region of the cylindrical projection 90 or gearwheel part 86, an inner circumferential surface 94 of the gearwheel part 86 and an outer circumferential surface 96 of the cylindrical projection 90 of the gearwheel part 88 are radially opposed. In this case, as is illustrated in FIG. 3, a smaller radial intermediate space can be present. Basically, however, the two gearwheel parts could also be mounted one on top of the other in the region of these two circumferential surfaces 94, 96 with a comparatively snug fit (see FIG. 4 and FIG. 5). It should be noted here that the toothing region 76, which is itself almost completely concealed by gearwheel part 86 in the view of the planet wheel 56 considered in viewing direction III in FIG. 2, is shown in FIG. 3 only for the sake of completeness.

Bulges 98 are provided radially outwardly at the inner circumferential surface 94 of the gearwheel part 86 preferably so as to be uniformly spaced over the circumference. Accordingly, these bulges 98 open radially inward and extend in axial direction preferably beyond the entire gearwheel part 86. In association with each bulge 98 at gearwheel part 86, a bulge 100 is provided radially inwardly at the cylindrical projection 90 of gearwheel part 88 in the region of the outer circumferential surface 96, which bulge 100 is accordingly radially outwardly open and preferably extends over the entire axial extension of the cylindrical projection 90. When the two gearwheel parts 86, 88 are positioned circumferentially in correct alignment with one another, a respective bulge 98 and a bulge 100 form a receiving volume for a connection element 102 formed in the manner of a pin. This connection element 102 which extends substantially axially in this receiving volume is preferably introduced by pressing in so that it is captively held at the two gearwheel parts 86, 88 on one hand, but the two gearwheel parts 86, 88 are also held at one another on the other hand against axial movement, i.e., movement in direction of the planet wheel rotational axis Z. At the same time, these connection elements 102 are in positive engagement with each of the gearwheel parts 86, 88 by the radial engagement in the bulges 98, 100 so that the latter are held with respect to one another against relative rotation by positive engagement. A further functionality of the connection elements 102 which are preferably uniformly distributed in circumferential direction consists in a centering of gearwheel part 86 on the cylindrical projection 90 of gearwheel part 88 so that both gearwheel parts 86, 88 are, or can be, positioned coaxial to the planet wheel rotational axis Z.

As is illustrated in FIG. 3, the two gearwheel parts 86, 88 can be coupled with one another in a number of relative rotational positions which correspond to the spacing of connection elements 102. Particularly, when the toothing geometries make necessary a uniquely defined position, marks 102 and 104, respectively, can be provided at the two gearwheel parts 86, 88 to identify a unique relative position of the two gearwheel parts 86, 88 with respect to one another. This is particularly advantageous when the gearwheel parts 86, 88 to be connected to one another must be joined manually. These marks 102, 104 can be provided so as to be visible at the two gearwheel parts 86, 88 on axial sides or front sides that are to be identically oriented. Alternatively or in addition, aligning formations which engage in one another by positive engagement could also be formed at the two gearwheel parts 86, 88.

Accordingly, when producing a planet wheel 56 of this kind the two gearwheel parts 86, 88 can be provided independently from one another with the required geometry, with the construction material, which may possibly differ for each gearwheel part, and with finishing processes which may possibly differ from one another, e.g., tempering or the like. In particular it is also possible to subject the inner circumferential surface 92 of gearwheel part 88 to a finishing process for functioning as bearing before the two gearwheel parts 86, 88 are connected so that no further machining steps need be carried out during or after the connection process, i.e., after pressing in the connection elements 102.

Figure 6:
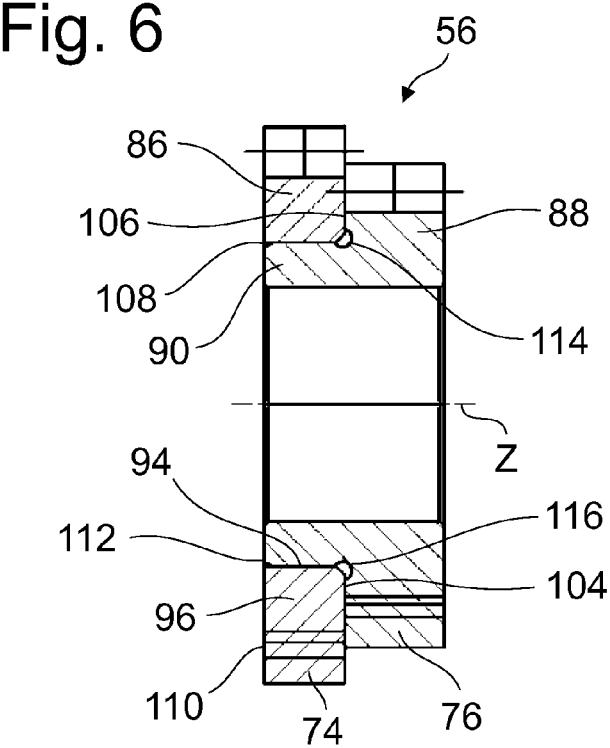
FIG. 6 is an axial sectional view of an alternative construction of the planet wheel.

FIG. 6 shows a planet wheel 56 whose two gearwheel parts 86, 88 have a construction similar to that described above. Gearwheel part 88 has the cylindrical projection 90 which engages inwardly into gearwheel part 86. As in the embodiment form described above, the two gearwheel parts 86, 88 are positioned relative to one another in such a way that when axial projection 90 engages in gearwheel part 86 the two gearwheel parts 86, 88 contact one another by axially opposed sides 104, 106 so that a defined axial position is predetermined.

In the exemplary embodiment shown in FIG. 6, the two gearwheel parts 86, 88 are connected to one another by bonding engagement. To this end, a weld seam 108 extending in circumferential direction around the planet wheel carrier axis Z is formed at that location where the two radially opposed circumferential surfaces 94, 96 are outwardly accessible at an axial front side 110 of the gearwheel part 86 and an axial front side 112 of the cylindrical projection 90 of gearwheel part 88. This weld seam can be formed, for example, by a fusion welding process such as laser welding, electron beam welding or by induction welding or electric resistance welding. For heat-related reasons, it is also possible to form the weld seam in a segmented manner, i.e., so as to be discontinuous in circumferential direction or by a plurality of spot welds that are preferably uniformly distributed in circumferential direction.

In order to achieve a defined radial positioning of gearwheel part 86 on gearwheel part 88 in this embodiment, it is advantageous to form the two radially opposed circumferential surfaces 94, 96 with the smallest possible radial clearance relative to one another.

In order to catch contaminants released during a welding connection process and which enter the area where the two circumferential surfaces 94, 96 adjoin, a particle collection cutout 114 in the shape of an undercut or the like can be formed at the location where the cylindrical projection 90 adjoins the axial front side 106 of the gearwheel part 88. This particle collection cutout 114 preferably extends circumferentially in a circumferential direction without being interrupted by the rotational axis Z. In order to increase this receiving volume, the gearwheel part 86 can be provided with a chamfer 116 at the point at which its inner circumferential surface 94 adjoins the axial front side 104 thereof.

Due to the possibility of collecting contaminants brought about during the welding process in a receiving volume of this kind, virtually any weld seam or weld seam geometries, e.g., V-seam, can be generated. The circumferential orientation of the two gearwheel parts 86, 88 with respect to one another can be predefined by using the marks described above with reference to FIG. 3. Alternatively or in addition, it is also possible, for example, by providing one or more connection elements 102, to predetermine the defined relative position of the two gearwheel parts 86, 88 in addition to the functionally of generating a positive engagement. It can be seen from this that it is also possible within the framework of the present invention to combine different types of connection, e.g., positive engagement and bonding engagement.

In order to protect the working toothing region 74, which has already been finish-machined, while a welding process is being carried out, this working toothing region 74 can be covered by an annular panel whose inside region exposes only that portion of the gearwheel part 86 and axial front side 112 of the cylindrical projection 90 that must be accessible to carry out the welding process. A cover panel of this kind can be applied manually or mechanically.

Figure 7:
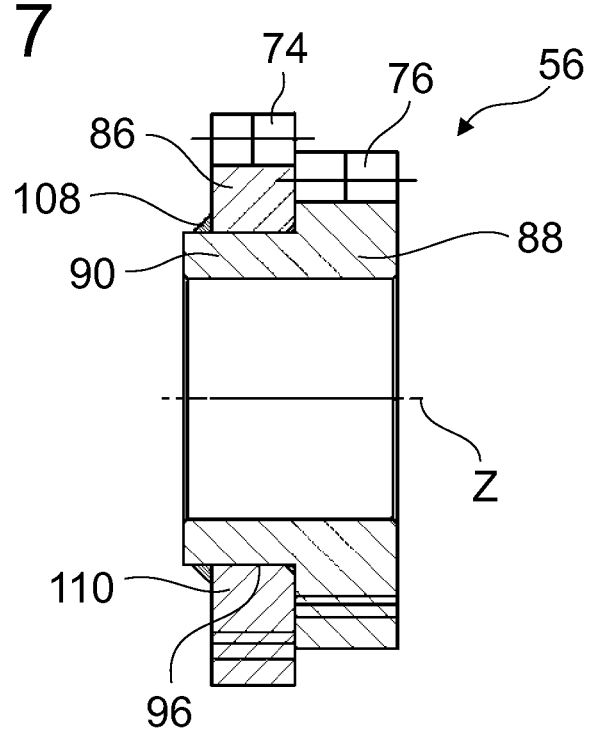
FIG. 7 is another axial sectional view of an alternative construction of the planet wheel.

FIG. 7 shows another alternative construction of planet wheel 56 in which the two gearwheel parts 86, 88 are connected to one another by bonding engagement. The cylindrical projection 90 of gearwheel part 88 extends through gearwheel part 86 and projects beyond the latter in direction of the planet wheel rotational axis Z. At the location where the outer circumferential surface 96 of the cylindrical projection 90 adjoins the axial front side 110 of gearwheel 86, a weld seam 108 is produced either in a continuous or segmented manner in a circumferential direction or in the form of a plurality of spot welds. Since the weld seam in this case is generated at an angle to the outer circumferential surface 96 on the one hand and relative to the axial front side 110 on the other hand, the risk of contaminants entering the region where the two gearwheel parts 86, 88 adjoin is reduced so that the volume for collecting particles, which was described above with reference to FIG. 6, can be dispensed with. However, this volume could, of course, also be provided in this embodiment. Further, it would be possible, if necessary, to carry out after-machining of the weld seam 108 in any manner in this embodiment.

Figure 8:
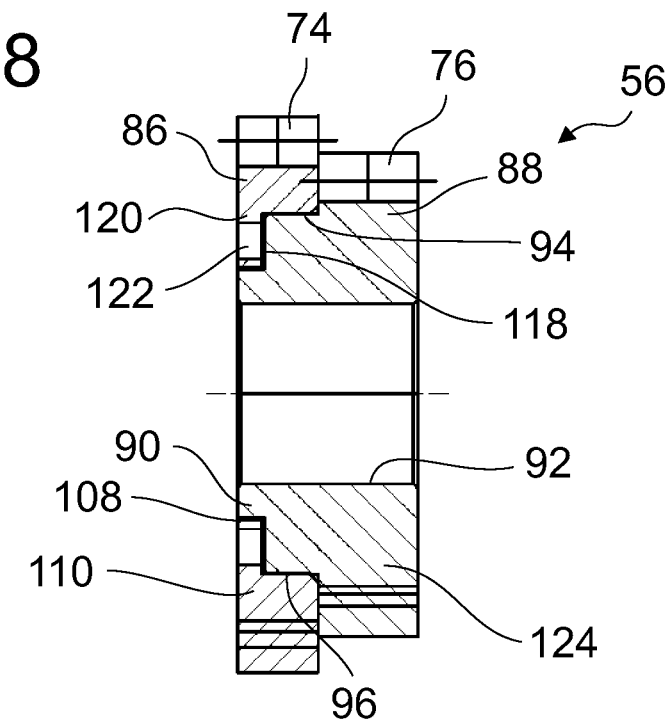
FIG. 8 is a further axial sectional view of an alternative construction of the planet wheel.

In the exemplary embodiment shown in FIG. 8, the cylindrical projection 90 of gearwheel part 86 is formed with a radial step 118. This means that the outer circumferential surface 96 and consequently also the inner circumferential surface 94 of gearwheel part 86 are formed in a stepped manner. At the location where the step is formed at the cylindrical projection 90, the gearwheel part 86 has a projection 120 that extends radially inward in a flange-like manner and which has a plurality of openings 122 successively in circumferential direction. At the location at which this radial projection 120 opposes the cylindrical projection 90 radially inwardly, the two gearwheel parts 86, 88 can be radially centered at one another and possibly also connected to one another by a weld seam 108.

For mounting the planet wheel 56 shown in FIG. 8, it is possible to apply a mounting force to the gearwheel part 86 radially outward of the radial projection 120 and accordingly to push gearwheel part 86 onto gearwheel part 88. In so doing, the surfaces used for the radial and axial bearing support of the planet wheel 56, i.e., the inner circumferential surface 94, the axial front side 110 of gearwheel part 86 and an axial front side 124 of gearwheel part 88 remote of the latter, can be finished after the two gearwheel parts 86, 88 are put together. To this end, it can be provided that one of the two gearwheel parts 86, 88 has a larger, axially projecting configuration with respect to the other, as can be seen, for example, in FIG. 7 in association with the cylindrical projection 90. Further, it is possible that the radial and axial bearings lie axially outward of the axial extension of the two gearwheel parts 86, 88 and are screened off or exposed after the latter are fixedly connected by mechanical machining. In other words, the mounting force for the welding process can be applied axially and/or radially outward of the extension of the gearwheel parts 86, 88.

Figure 9:
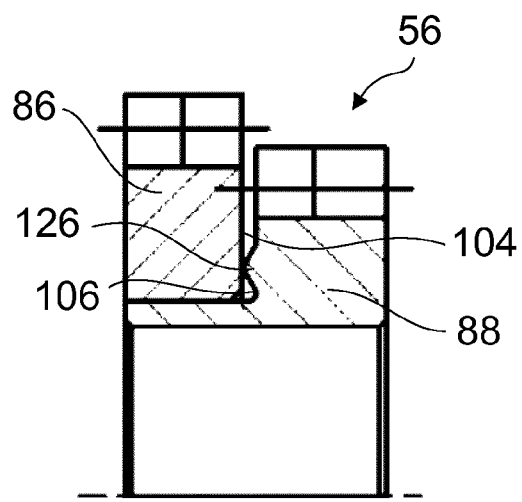
FIG. 9 is a fragmentary axial sectional view of a further alternative construction of the planet wheel before carrying out a welding connection process.
Figure 10:
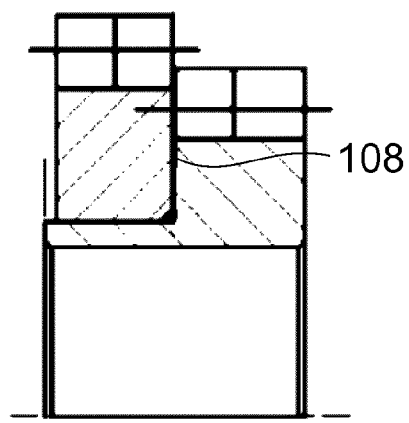
FIG. 10 is the planet wheel of FIG. 9 after carrying out a welding connection process.

FIGS. 9 and 10 show a planet wheel 56 in which the two gearwheel parts 86, 88 are connected to one another in the area of their axially opposed front sides 104, 106 by induction welding or electric resistance welding. To this end, there is provided at front side 106 or, alternatively, at front side 104, an axial protuberance area 126 fused by applying an electric voltage or current and by corresponding application of axial force and which, as is illustrated by FIG. 10, disappears so that the two gearwheel parts 86, 88 contact one another essentially without a gap in the region of their front sides 104, 106 and are accordingly connected to one another there in the region of axially opposed surfaces by a weld seam 108. In this case, a circumferential, segmented or punctiform welding can be generated corresponding to the circumference geometry of the protuberance 126.

Figure 11:
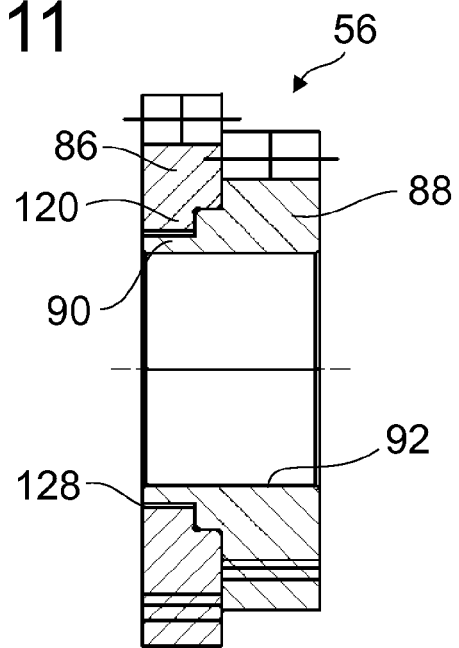
FIG. 11 is a further axial sectional view of an alternative construction of the planet wheel.

In the planet wheel 56 shown in FIG. 11, the two gearwheel parts 86, 88 are formed with a geometry similar to that shown in FIG. 8. A bonding connection is produced by solder material 128 radially between the radial projection 120 of gearwheel part 86 and the opposing portion of the cylindrical projection 90 of the gearwheel part 88. This solder material 120 can be introduced in the form of a solder ring, melted by applying high temperature to the gearwheel parts 86, 88 for generating the material bond, and then cooled. The geometry of the solder ring used for this purpose can be adapted to the geometry of the opposed inner circumferential surfaces and outer circumferential surfaces, with or without steps, as the case may be, of the gearwheel parts 86, 88.

The stepped construction is particularly advantageous because a heating of the gearwheel part 88 can be carried out in particular at the location where this gearwheel part 88 or the cylindrical projection 90 thereof has a comparatively small radial thickness and the input of heat can accordingly be kept within limits. Since an intensive heating of the gearwheel parts 86, 88 is required for carrying out the connecting process, it may further be necessary or advantageous for the inner circumferential surface 92 of gearwheel part 88, i.e., the surface serving to support the planet wheel 56, to undergo finishing only after the connecting process has been carried out in order to achieve an exact cylindrical surface.

Figure 12:
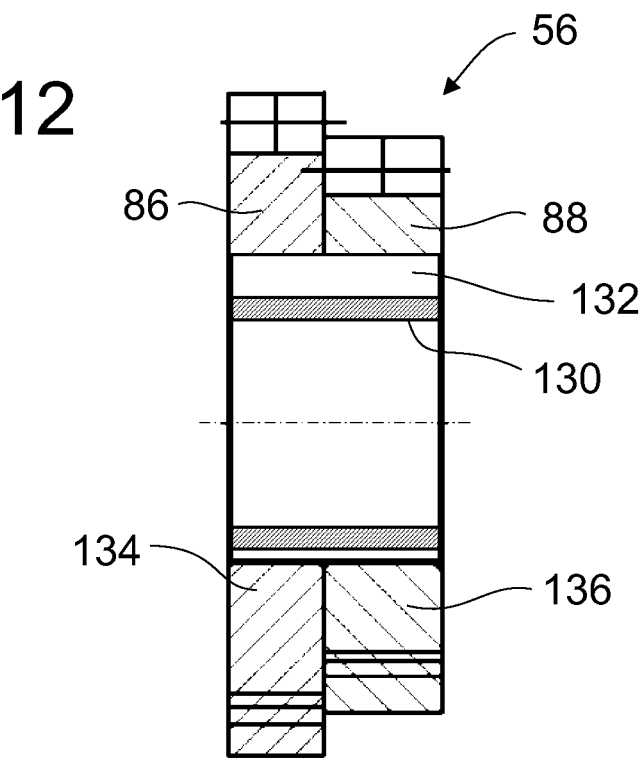
FIG. 12 is a further axial sectional view of an alternative construction of the planet wheel.

FIG. 12 shows a further exemplary embodiment of a planet wheel 56 in which the two gearwheel parts 86, 88 are connected to one another by positive engagement. In this case there is provided a substantially sleeve-shaped connection element 130 that extends in axial direction along the two gearwheel parts 86, 88 and which preferably has the same length as these two gearwheel parts 86, 88 taken together. An outer circumferential connection toothing 132, which can extend along the entire length of the connection element 130, is provided at the outer circumference of the sleeve-shaped connection element 130. An inner circumferential connection toothing 136 is provided at the inner circumference of gearwheel part 86 and an inner circumferential connection toothing 136 is provided at the inner circumference of gearwheel part 88. These two connection toothings 134, 136 meshingly engage with the outer circumferential connection toothing 132 such that the two gearwheel parts 86, 88 are held so as to be fixed with respect to relative rotation with the intermediary of the connection element 130. In order to achieve a fixed axial engagement with one another, the two toothings 132, 134, 136 can be pushed together with a very snug fit, for example, with an interference fit. It is basically also possible to connect the sleeve-shaped connection element 130 by bonding to one, or preferably both, of the gearwheel parts 86, 88, i.e., for example, by welding, soldering or gluing. A fixed axial connection of the two gearwheel parts 86, 88 to the sleeve-shaped connection element 130 can be dispensed with particularly when axial supports are also provided for the entire planet wheel 56 at the planet wheel carrier 54 as was described above with reference to FIGS. 1 and 2, because these three parts can be held in a defined position relative to one another by these axial bearings or supports. In other words, particularly the sleeve-shaped connection element 130 can be formed with a floating bearing relative to the planet wheel carrier 54.

Figure 13:
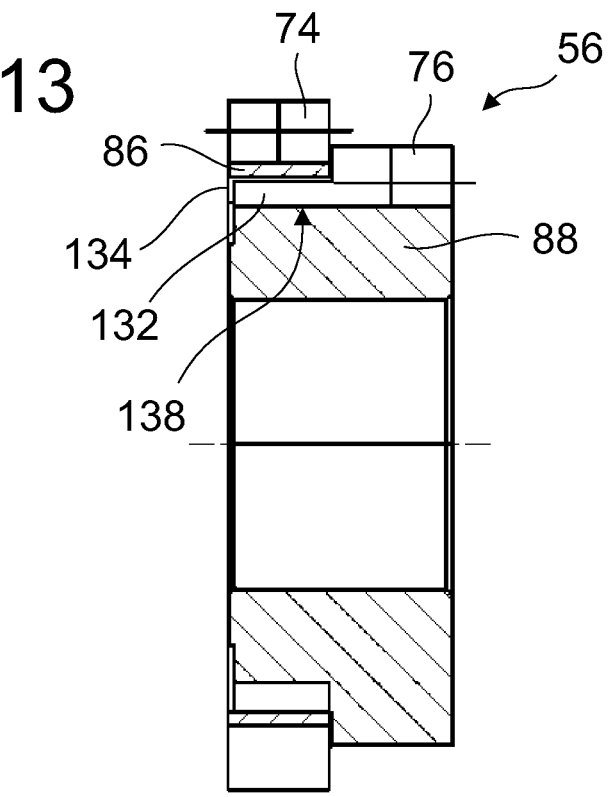
FIG. 13 is a further axial sectional view of an alternative construction of the planet wheel.

FIG. 13 shows a constructional variant in which, with its axial portion 138, the working toothing region 76, provided at gearwheel part 88 as an outer circumferential toothing, provides the outer circumferential connection toothing 132 that meshingly engages with the inner circumferential connection toothing 134 of gearwheel part 86. It will be seen that a step-like expansion of the teeth of toothing region 76 is provided in the transition to the portion still remaining as working toothing region, and the gearwheel part 86 can be axially supported thereon so that a defined axial positioning of the two gearwheel parts 86, 88 with respect to one another is provided. A defined radial positioning of the two gearwheel parts 86, 88 with respect to one another can be realized in the same way by toothings 132, 134.

Figure 14:
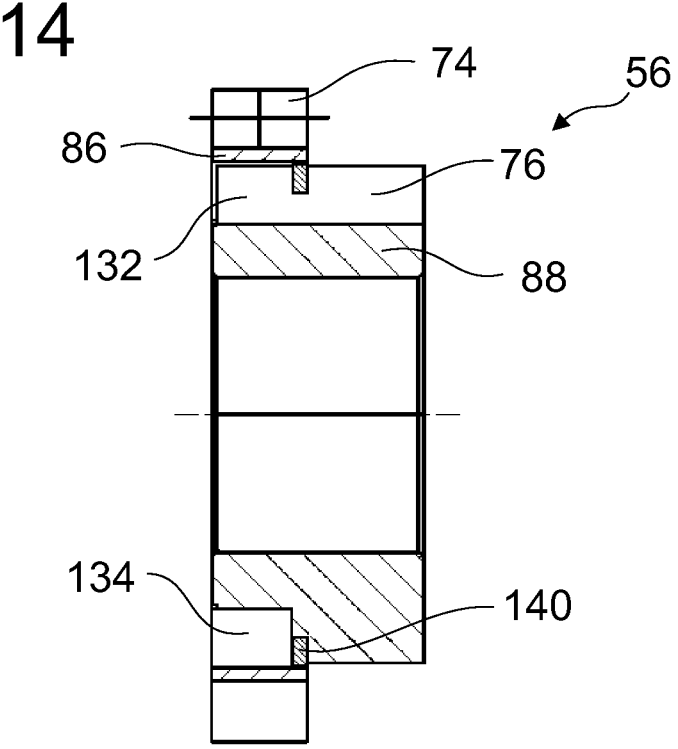
FIG. 14 is a further axial sectional view of an alternative construction of the planet wheel.

In the exemplary embodiment shown in FIG. 14, the working toothing region 76 of gearwheel part 88 again forms the outer circumferential connection toothing 132. In this case, however, the working toothing region 76 is formed so as to extend continuously in axial direction over the gearwheel part 88 without changing geometry. In order to predefine a definite axial position of the gearwheel part 86 in this case, a retaining element 140, for example, a retaining ring at which the gearwheel part 86 can be axially supported can be inserted into a radially outwardly open circumferential groove in the working toothing region 76. This annular retaining element 140 can be formed, for example, as a spring ring, for example, as a circlip. This ring-shaped retaining element 140 can be prevented from coming loose on the radially outer side in that the gearwheel part 86 overlaps it axially and accordingly blocks it from moving radially outward.

Figure 15:
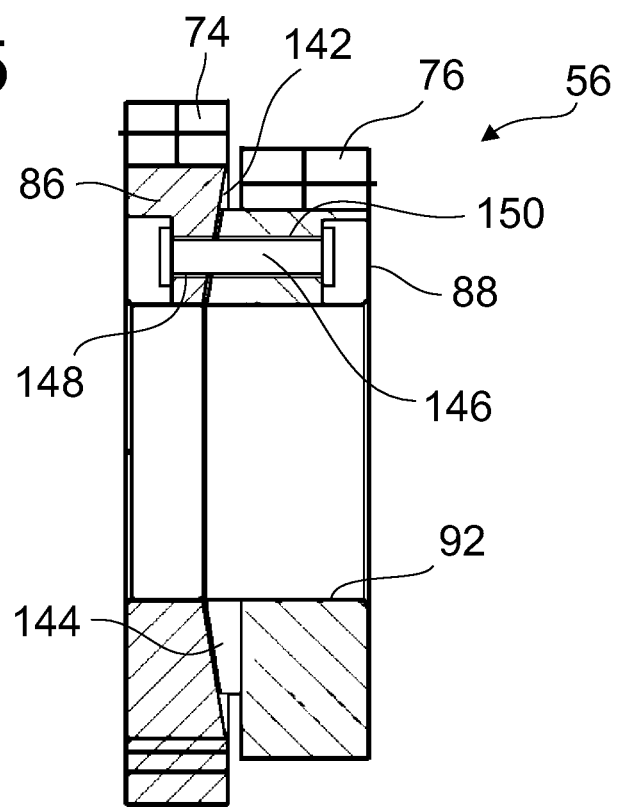
FIG. 15 is a further axial sectional view of an alternative construction of the planet wheel.

FIG. 15 shows an exemplary embodiment in which the connection of the two gearwheel parts 86, 88 of the planet wheel 56 is realized by positive engagement with axially opposed axial connection toothings 142, 144. For example, these toothings can be formed as Hirth couplings. Axial engagement is ensured by pin-like connection elements 146, each of which axially penetrates through-openings or holes 148, 150 in the two gearwheel parts 86, 88 and engages in the manner of rivets behind the gearwheel parts 86, 88 at sides thereof, which are at a distance from one another or remote of one another.

It will be seen in the embodiment shown in FIG. 15 that the inner circumferential surface 92 of the planet wheel 56 is provided only partially at gearwheel part 88, but also partially at gearwheel part 86.

It should be noted here that its other connection elements can be inserted as screws, grooved pins or the like to realize the axial engagement.

FIG. 16 shows an exemplary embodiment of a planet wheel 56 in which the two gearwheel parts 86, 88, which are disk-shaped in this instance, are held so as to contact one another by frictional engagement at a sleeve-shaped connection element 152. The two gearwheel parts 86, 88 have inner circumferential surfaces 94, 154 having the same radial distance from the planet wheel rotational axis Z so that the sleeve-shaped connection element 152 can be formed over its entire axial extension with an outer circumferential surface 156 with the same radial distance from the planet wheel rotational axis Z. The frictional engagement can be realized by an interference fit or shrink fit.

In the exemplary embodiment shown in FIG. 17, the sleeve-shaped connection element 152, which here also provides an inner circumferential surface 158 for the radial support of the planet wheel 56, is formed with a stepped outer circumferential surface 156 so that a defined axial position is first predefined for the gearwheel part 88, which has an inner circumferential surface 154 at a shorter radial distance from the planet wheel rotational axis Z, and a defined axial position is predetermined for gearwheel part 88 by this gearwheel part 88.

The planet wheel 56 is also formed with gearwheel parts 86, 88 fixedly connected to one another by frictional engagement in the constructional variant shown in FIG. 18. To this end, the gearwheel part 88 again has the cylindrical projection 90, the gearwheel part 86 being arranged on the outer circumferential surface 96 thereof by its inner circumferential surface 94 by interference fit or shrink fit. The gearwheel part 88 again provides a defined axial stop for gearwheel part 86 by the axial front side 106.

In conclusion, it should be noted that the various constructional variations mentioned above can, of course, also be combined with one another. For example, gearwheel part 88 could basically be formed in two parts with an annular disk-shaped part providing the working toothing region 76 and a sleeve-shaped part providing the cylindrical projection 90. These two parts could be fixedly connected to one another by frictional engagement and/or bonding engagement. The other gearwheel part, i.e., gearwheel part 86, could then be connected to the sleeve-shaped part of gearwheel part 88 by positive engagement, for example, in the manner described with reference to FIGS. 3 to 5. This sleeve-shaped part of gearwheel part 88 could also be formed with an outer circumferential connection toothing in the same longitudinal portion in which it is to be connected to gearwheel part 86 so that a positively engaging connection can be realized in the same way.

Further, the geometric configuration of the two gearwheel parts relative to one another can, of course, also be reversed and, of course, the two gearwheel parts can also be formed with toothings of identical diameter but, for example, different tooth geometry.

Further, it is noted that within the meaning of the present invention the toothings serving for the mutual rotational coupling of the gearwheel parts are basically formations which prevent a relative rotation through their special configuration. Toothings in this sense are accordingly also polygonal or, generally, non-rotationally symmetrical circumferential geometries such as, e.g. ovals or elliptical geometries.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A torsional vibration damping arrangement for a drivetrain of a vehicle, comprising:
   an input region (12) configured to be driven in rotation around an axis of rotation (A);
   an outsut region (14);
   a first torque transmission path (20);
   a second torque transmission path (22) arranged parallel to the first torque transmission path (20) the first and second torques transmissions paths (20; 22) being arranged between the input region (12) and the output region (14);
   a phase shifter arrangement (26), arranged at least in the other of the first and second torque transmission paths (20), the phase shifter arrangement (26) being configured to generate a phase shift of rotational irregularities transmitted via the other of the first and second torque transmission paths (20) relative to rotational irregularities transmitted via the one of the first and second torque transmission paths (22);
   a coupling arrangement (24) configured to destructively superpose torques transmitted via the first and second torque transmission paths (20, 22),
   wherein the coupling arrangement (24) comprises a planetary gear arrangement (52) with a planet wheel carrier (54) coupled to one of the first and second torque transmission paths (22) and planet wheels (56), each comprising a gear wheel rotatably supported at the planet wheel carrier (56);
   said gearwheel comprising:
   a first gearwheel part (86);
   a first working toothing region (74) provided at the first gearwheel part (86);
   a second gearwheel part (88); and
   a second working toothing region (76) provided at the second gearwheel part (88),
   wherein:
   the two working toothing regions (74, 76) are arranged successively in a direction of a gearwheel rotational axis (Z), and
   the first and second gearwheel parts (86, 88) are connected to one another by positive engagement and/or bonding engagement and/or frictional engagement so as to rotate together around the gearwheel rotational axis (Z) and/or against relative movement with respect to one another in the direction of the gearwheel rotational axis (Z).

2. The torsional vibration damping arrangement according to claim 1, wherein the positive engagement is produced by:
   at least one connection element (102; 130; 146) in positive engagement with the first gearwheel part (86) and/or the second gearwheel part (88), and/or
   connection toothings (134, 132) provided at the first gearwheel part (86) and at the second gearwheel part (88).

3. The torsional vibration damping arrangement according to claim 2, wherein the at least one connection element (102; 146) is substantially pin-shaped and configured to engage a connection cutout (98; 148) of the first gearwheel part (86) and a connection cutout (100; 150) of the second gearwheel part (88).

4. The torsional vibration damping arrangement according to claim 3, wherein the gearwheel parts (86, 88) are held by the at least one connection element (102; 146) against relative movement in the direction of the gearwheel rotational axis (Z).

5. The torsional vibration damping arrangement according to claim 4, wherein the connection cutout (98) at one of the first and second gearwheel parts (86) extends radially outwardly at an inner circumferential surface (94) as a bulge extending in the direction of the gearwheel rotational axis (Z), and the connection cutout (100) at the other of the first and second gearwheel part (88) extends radially inwardly at an outer circumferential surface (96) as a bulge extending in the direction of the gearwheel rotational axis (Z), wherein the at least one connection element (102) is positioned radially between the inner circumferential surface (94) and the outer circumferential surface (96).

6. The torsional vibration damping arrangement according to claim 5, wherein the at least one connection element (102) is configured to be pressed into the connection cutouts (98, 100) associated with the at least one connection element (102).

7. The torsional vibration damping arrangement according to claim 6, wherein the connection cutouts (148, 150) are formed at the first and second gearwheel parts (86, 88) as through-openings, wherein the at least one connection element (146) is positioned so as to engage in connection cutouts (148, 150) of the first and second gearwheel parts (86, 88), which connection cutouts (148, 150) are positioned so as to be aligned with one another.

8. The torsional vibration damping arrangement according to claim 2, wherein the at least one connection element (146) engages behind at least one of the first and second gearwheel parts (86, 88).

9. The torsional vibration damping arrangement according to claim 2, wherein the at least one connection element (130) is sleeve-shaped and has an outer circumferential connection toothing (132), wherein an inner circumferential connection toothing (134, 136) is provided at at least one of the first and second gearwheel parts (86, 88), for engaging with the outer circumferential connection toothing (132).

10. The torsional vibration damping arrangement according to claim 2, further comprising an outer circumferential connection toothing (132), arranged at one of the first and second gearwheel parts (88), and an inner circumferential connection toothing (134), engaging with the outer circumferential connection toothing (132), arranged at the other of the first and second gearwheel parts (86).

11. The torsional vibration damping arrangement according to claim 10, wherein the outer circumferential connection toothing (132) comprises the working toothing (76) of the one of the first and second gearwheel parts (88).

12. The torsional vibration damping arrangement according to claim 2, further comprising a first axial connection toothing (142), arranged at the one of the first and second gearwheel parts (86), and a second axial connection toothing (144), engaging with the first axial connection toothing (142), arranged at the other of the first and second gearwheel parts (88).

13. The torsional vibration damping arrangement according to claim 1, wherein the bonding engagement is produced by welding and/or soldering and/or gluing.

14. The torsional vibration damping arrangement according to claim 13, wherein the welding is produced by fusion welding of a type from the group consisting of: preferably laser welding, electron beam welding, induction welding, electric resistance welding and friction welding.

15. The torsional vibration damping arrangement according to claim 14, wherein the gearwheel parts (86, 88) are configured to be connected in a region of radially or axially opposed surfaces (94, 96; 104, 106).

16. The torsional vibration damping arrangement according to claim 15, further comprising a particle collection cutout (114, 116) arranged in the region of the axially or radially opposed surfaces (94, 96; 104, 106) in at least one of the first and second gearwheel parts (86, 88).

17. The torsional vibration damping arrangement according to claim 1, wherein the frictional engagement is produced by interference fit and/or shrink fit.

18. The torsional vibration damping arrangement according to claim 17, further comprising a sleeve-shaped connection element (154) having a circumferential surface (156), in frictional engagement with at least one of the first and second gearwheel parts (86, 88).

19. The torsional vibration damping arrangement according to claim 17, wherein one of the first and second gearwheel parts (88) has a circumferential surface (96), in frictional engagement with the other of the first and second gearwheel parts (86).

20. The torsional vibration damping arrangement according to claim 1, further comprising a damper element arrangement (40, 50), wherein the phase shifter arrangement (26) comprises a vibration system (28) with a primary side (30) and a secondary side (44) rotatable with respect to the primary side (30) around the axis of rotation (A) against the action of the damper element arrangement (40, 50).

* * * * *